United States Patent
Cao et al.

(10) Patent No.: US 11,190,669 B2
(45) Date of Patent: Nov. 30, 2021

(54) SYSTEM AND METHOD FOR IMAGE PROCESSING

(71) Applicant: SZ DJI TECHNOLOGY CO., LTD., Shenzhen (CN)

(72) Inventors: Zisheng Cao, Shenzhen (CN); Wei Chen, Shenzhen (CN); Xiaozheng Tang, Shenzhen (CN); Mingyu Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 402 days.

(21) Appl. No.: 16/242,375

(22) Filed: Jan. 8, 2019

(65) Prior Publication Data
US 2019/0149693 A1    May 16, 2019

Related U.S. Application Data

(63) Continuation of application No. PCT/CN2016/089303, filed on Jul. 8, 2016.

(51) Int. Cl.
| | | |
|---|---|---|
| *G06K 9/00* | (2006.01) | |
| *H04N 1/40* | (2006.01) | |
| *H04N 1/60* | (2006.01) | |
| *H04N 9/73* | (2006.01) | |

(52) U.S. Cl.
CPC ........... *H04N 1/40012* (2013.01); *H04N 1/60* (2013.01); *H04N 1/6027* (2013.01); *H04N 9/735* (2013.01); *G09G 2320/0666* (2013.01)

(58) Field of Classification Search
None
See application file for complete search history.

(56) References Cited

U.S. PATENT DOCUMENTS

| | | | |
|---|---|---|---|
| 2002/0163669 A1 | 11/2002 | Yamazaki et al. | |
| 2010/0231426 A1* | 9/2010 | Van Der Vleuten | ... H04N 19/46 341/107 |
| 2012/0002082 A1* | 1/2012 | Johnson | ............. H04N 5/23258 348/234 |
| 2016/0323556 A1* | 11/2016 | Luginbuhl | .............. G06T 5/007 |

FOREIGN PATENT DOCUMENTS

| | | |
|---|---|---|
| CN | 1555198 A | 12/2004 |
| CN | 1700253 A | 11/2005 |
| CN | 104364820 A | 2/2015 |
| JP | 2004032140 A | 1/2004 |

OTHER PUBLICATIONS

The World Intellectual Property Organization (WIPO) International Search Report and Written Opinion for PCT/CN2016/089303 dated Mar. 31, 2017 6 Pages.

* cited by examiner

*Primary Examiner* — Soo Jin Park
(74) *Attorney, Agent, or Firm* — Anova Law Group, PLLC

(57) ABSTRACT

A method for image processing includes color correcting an image via a first color mapping process to obtain a color corrected image, and compressing the color corrected image via a second color mapping process to obtain a compressed image.

18 Claims, 18 Drawing Sheets

SYSTEM AND METHOD FOR IMAGE PROCESSING

CROSS-REFERENCE TO RELATED APPLICATION

This application is a continuation of International Application No. PCT/CN2016/089303, filed on Jul. 8, 2016, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to digital imaging technology and more particularly, but not exclusively, to systems and methods for image processing.

BACKGROUND

A conventional digital imaging device, such as a digital camera, can capture images via an image sensor. The images can be stored on a digital image storage device to be subsequently retrieved for presentation and editing on a display device. Thus, the image sensor, the digital image storage device, and the display device are used at specific stages of image processing.

One parameter of image processing is dynamic range. A dynamic range can include a ratio between a maximum luminance and a minimum luminance of the image that a device (that is, the image sensor, the digital image storage device, or the display device) can perceive from the image. An exemplary expression of dynamic range is as follows:

$$DR = 20 \log_{10}\left(\frac{I_{max}}{I_{min}}\right) \quad \text{Equation (1)}$$

where DR is the dynamic range in decibels, and Imax and Imin are the maximum luminance and the minimum luminance, respectively, as perceived by the device. A higher dynamic range indicates higher contrast or greater color saturation and thus can lead to a more enjoyable visual effect.

Dynamic range can be based on a bit width of images that the device is capable of processing. For example, if the device has a capability of processing an 8-bit digital image, the dynamic range can be as follows:

$$DR = 20 \log_{10}(256/1) = 48.16 \text{ dB}. \quad \text{Equation (2)}$$

Although image sensor technology has recently made great advancement, capability of a typical digital image storage device does not match the capability of image sensors. For example, an image sensor is capable of capturing an image at a bit width that is greater than a bit width at which a digital image storage device is capable of storing the image. Thus, the bit width of an image needs to be reduced to be stored. For example, a 14-bit image captured by the image sensor can be truncated by 6 bits to be stored on an 8-bit digital image storage device. The maximum dynamic range of the image can thus be reduced by 36 dB. Such a loss can result in less satisfactory visual effect (such as a color image having a gray appearance), and does not take full advantage of capability of the image sensor.

In view of the foregoing, there is a need for improved image processing system and methods that can fully utilize capability of the image sensor and reduce loss of dynamic range.

SUMMARY

In accordance with a first aspect disclosed herein, there is set forth a method for image processing, including:
color correcting an image via a first color mapping process; and
compressing the color corrected image via a second color mapping process.

In accordance with another aspect disclosed herein, there is set forth a system for image processing, including one or more processors that operate to:
color correct an image via a first color mapping process; and
compress the color corrected image via a second color mapping process.

In accordance with another aspect disclosed herein, there is set forth a digital imaging device, including:
an image sensor; and
one or more processors that operate to:
obtain an image via the image sensor;
color correct the image via a first color mapping process; and
compress the color corrected image via a second color mapping process.

In accordance with another aspect disclosed herein, there is set forth a system for image processing, including:
a first color mapping module that operates to color correct an image via a first color mapping process; and
a second color mapping module that operates to compress the color corrected image via a second color mapping process.

In accordance with another aspect disclosed herein, there is set forth a computer program product including instructions for image processing.

Figure 1:
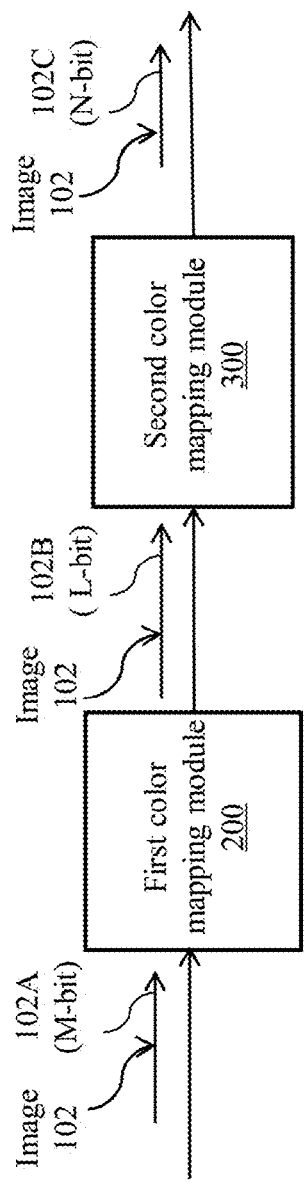
FIG. 1 is an exemplary top-level block diagram illustrating an embodiment of an image processing system comprising first and second color mapping modules.

It should be noted that the figures are not drawn to scale and that elements of similar structures or functions are generally represented by like reference numerals for illustrative purposes throughout the figures. It also should be noted that the figures are only intended to facilitate the description of the embodiments. The figures do not illustrate every aspect of the described embodiments and do not limit the scope of the present disclosure.

DETAILED DESCRIPTION OF THE EMBODIMENTS

Since currently-available methods and systems are incapable of storing an image while preserving dynamic range at which the image is captured, a method and system that prevent significant loss of dynamic range can prove desirable and provide a basis for a wide range of applications, such as presenting an image that is captured in challenging conditions such as in an environment with significant variation of lighting intensities even if the image needs to be stored on a low bit-width storage device. This result can be achieved, according to embodiments disclosed herein, by an image processing system 100 as illustrated in FIG. 1.

Turning now to FIG. 1, the image processing system 100 is shown as including a first color mapping module 200 and a second color mapping module 300. The image processing system 100 can process an image 102 via various operations as disclosed herein. The first color mapping module 200 can receive an image 102 and can process the image 102 using a first color mapping process. The image 102 can include an array of pixels each having intensity values at one or more color channels respectively. The image 102 that the first color mapping module 200 receives can be referred to as an image 102A. In an illustrative example, the image 102A can be in an RGB (red, green, and blue) color space. Each pixel of the image 102A can thus have a respective intensity value for each of the R, G, and B channels. Other exemplary color spaces for the image 102A can include sRGB color space with coordinates (RsRGB, GsRGB, BsRGB), International Commission on Illumination (CIE) 1931 XYZ color space, and/or CIE L*a*b* color space, without limitation. The image 102A can comprise a digital image and be represented in an M-bit format. That is, the intensity value at each color channel can be expressed with an M-bit binary number, wherein M can be any predetermined integer.

The first color mapping process can include transforming the image 102A into a color corrected image 102B. In one embodiment, the first color mapping process can include color correction. Color correction can include a transformation defined by a set of one or more color correction parameters. Such parameters typically can be uniquely calibrated for a selected digital imaging device 800 (shown in FIG. 10) to find customized parameter values that accurately reflect the color response characteristics of the selected digital imaging device 800. Because the selected digital imaging device 800 for capturing the image 102 can acquire colors differently from the way that human eyes perceive color, the image 102 can benefit from the color correction. The color correction can transform the image 102 to achieve a realistic look and/or otherwise render color based on a predetermined standard.

Additionally and/or alternatively, the first color mapping process can transform the image 102A with the M-bit format into the color-corrected image 102B of an L-bit format, wherein L can be any predetermined integer. The values of M and L can be uniform and/or different. In one embodiment, M can be equal to L.

The second color mapping module 300 can receive the color-corrected image 102B. As shown in FIG. 1, the second color mapping module 300 can receive the color-corrected image 102B from the first color mapping module 200. The second color mapping module 300 can process the received color-corrected image 102B via a second color mapping process. For example, the second color mapping process can compress the color-corrected image 102B to generate a compressed image 102C. Compressing the color-corrected image 102B can include reducing a range and/or sub-range of intensity values of the color-corrected image 102B. The intensity values of the compressed image 102C can thus require a smaller bit width for storage than the bit width required by the intensity values of the color-corrected image 102B.

Additionally and/or alternatively, the second color mapping process can transform the color-corrected image 102B at the L-bit format into the compressed image 102C at an N-bit format, wherein N can be any predetermined integer. The value of N and L can be uniform and/or different. In one embodiment, N can be less than and/or equal to L.

Figure 2:
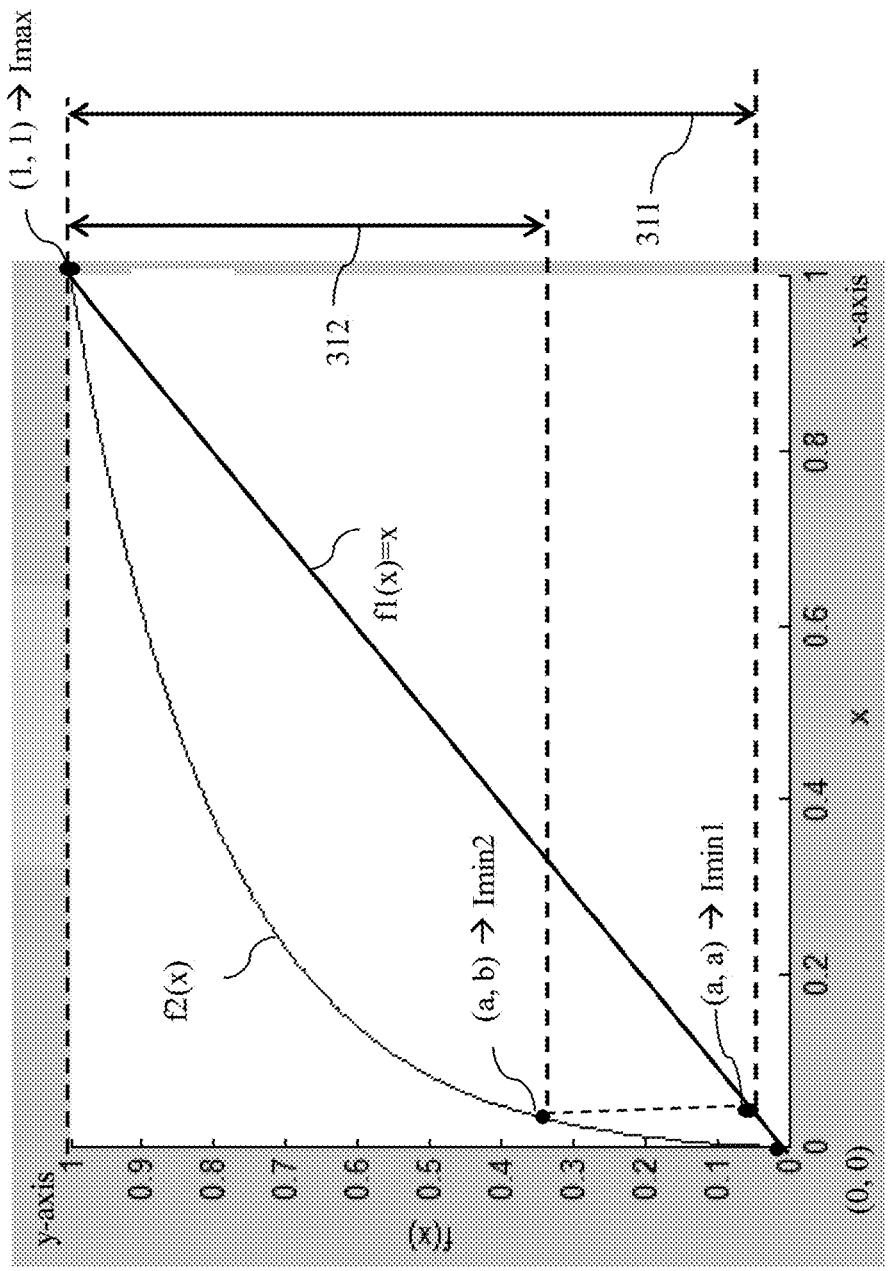
FIG. 2 is an exemplary color mapping function of the second color mapping module of FIG. 1.

Turning now to FIG. 2, an exemplary color mapping function 310 is shown as a function f2(x) plotted in an f(x)–x graph. The x-axis corresponds to an input pixel value of a selected channel of the color-corrected image 102B (shown in FIG. 1). The y-axis corresponds to an output pixel value generated using the color mapping function 310 for the selected channel of the compressed image 102C (shown in FIG. 1). The input pixel value and the output pixel value can express fraction of full bit value based on the bit width of the selected channel. The input value and output value can be based on uniform and/or different bit widths. As described with reference to FIG. 1, the color mapping function 310 can map the input value at L bit width to output value at N bit width.

The second color mapping module 300 (shown in FIG. 1) can use the color mapping function 310 for compressing at least one channel of the color-corrected image 102B to generate the compressed image 102C (shown in FIG. 1).

A reference function f1(x)=x is shown as a straight line passing points (0, 0) and (1, 1), to illustrate the color-corrected image 102B without compression. At the point (1, 1), f1(x) can correspond to Imax, which is a maximum intensity value of the channel based on the bit width of the color-corrected image 102B. At a point (a, a), f1(x) can correspond to Imin1, which is a minimum intensity value of the channel based on the bit width of the color-corrected image 102B. For example, when the color-corrected image 102B is in a 10-bit format, Imax=210 and Imin1=20=1.

In comparison, the color mapping curve 310 can be expressed by the function f2(x). At a vicinity of the point (0, 0), the function f2(x) can have a slope that is greater than the slope of the reference function f1(x)=x. Thus, the point (a, a) can be transformed to point (a, b), where b>a. At the point (a, b), f2(x) can correspond to Imin2, which is a minimum intensity of the channel based on the bit width of the compressed image 102C.

As shown in FIG. 2, a value range 311 between Imax and Imin1 can be thus compressed into a value range 312. Stated somewhat differently, the curve of f2(x) can be expanded along y-axis at the vicinity of the point (0, 0), so the value range 311 between Imax and Imin1 can be compressed into a value range 312.

In the event that one or more least significant bits of intensity values are removed from the compressed image 102C, that is, the compressed image 102C loses intensity resolution at low intensity, information loss for the compressed image 102C can be less than information loss for the color-corrected image 102B. Stated somewhat differently, the function f2(x) can implement compression by reallocating the bits for preserving intensity values. Human eyes are typically more sensitive to change in low intensity illumination than to change in high intensity illumination. Therefore, when the compressed image 102C is subsequently decompressed, intensity values at low intensity can be at least partially restored and greater visual effect can be perceived.

In view of Equation (1), the ranges 311, 312 can be related to the dynamic ranges. Thus, compressing the value range 311 into the value range 312 can indicate that the dynamic range of the color-corrected image 102B can be compressed via the second color mapping process.

The color mapping function 310 can include any type of functions for achieving the compression operation of f2(x) illustrated in FIG. 2. In one embodiment, the color mapping curve 310 can include a logarithmic function. An exemplary logarithmic function can have a form as follows:

$$f2(x) = A + B * \log_C\left(\frac{x*D+E}{F}\right) \quad \text{Equation (3)}$$

where A, B, C, D, E and F can each be a numerical value.

Figure 3:
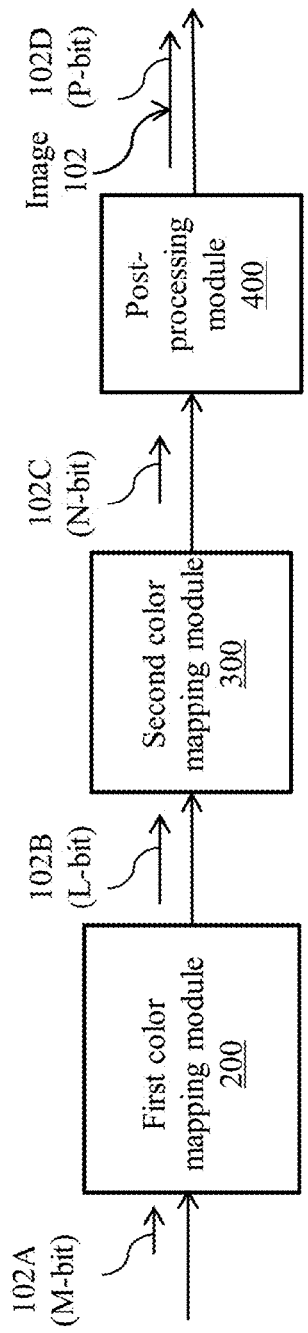
FIG. 3 is an exemplary block diagram illustrating an alternative embodiment of the image processing system of FIG. 1, wherein the image processing system includes a post-processing module.

Turning now to FIG. 3, the exemplary image processing system 100 is shown as including a post-processing module 400. The post-processing module 400 can transform the compressed image 102C from the N-bit format to a P-bit format, wherein P can be any predetermined integer. P can be less than N. The image 102 having the bit width reduced via the post-processing module 400 can be referred to as a reduced-bit-width image 102D. The post-processing module 400 can reduce the bit width of the compressed image 102C in any manner. For example, the post-processing module 400 can reduce the bit width of the compressed image 102C by truncating (N-P) least significant bits (that is, the last N-P bits) from the bit width of the compressed image 102C.

Additionally and/or alternatively, the post-processing module 400 can transform the compressed image 102C into the reduced-bit-width image 102D via a selected color transformation process, for instance, to ease subsequent encoding and/or storage. For example, the post-processing module 400 can transform the compressed image 102C in the RGB color space into the reduced-bit-width image 102D in a YCbCr color space. Additionally and/or alternatively, the post-processing module 400 can perform operations for enhancing quality of the image including, for example, YCbCr denoising and/or YCbCr sharpening.

Figure 4:
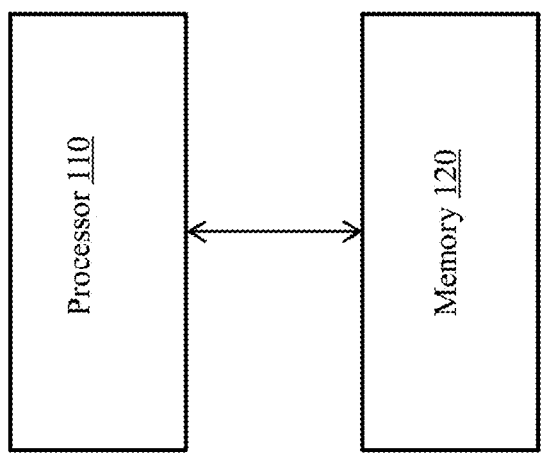
FIG. 4 is an exemplary block diagram illustrating another alternative embodiment of the image processing system of FIG. 1, wherein the image processing system includes a processor and a memory.

Turning now to FIG. 4, the exemplary image processing system 100 is shown as including a processor 110 and a memory 120. The processor 110 can comprise any type of processing system for implementing color mapping functions and/or other operations described in the present disclosure.

Exemplary processors 110 can include, without limitation, one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. In certain embodiments, the processor 110 can include an image processing engine or media processing unit, which can include specialized hardware for enhancing the speed and efficiency of certain operations for image capture, image filtering, and image processing. Such operations include, for example, Bayer transformations, demosaicing operations, white balancing operations, color correction operations, noise reduction operations, and/or image sharpening/softening operations. In certain embodiments, the processor 110 can include specialized hardware and/or software for performing various color mapping functions and operations described herein. Specialized hardware can include, but are not limited to, specialized parallel processors, caches, high speed buses, and the like. Although one processor 110 is shown in FIG. 4 for illustrated purposes only, the image processing system 100 can include any number of uniform and/or different processors 110.

The memory 120, alternatively referred to herein as a non-transitory computer readable medium, can comprise any type of memory and can be, for example, a random access memory (RAM), a static RAM, a dynamic RAM, a read-only memory (ROM), a programmable ROM, an erasable programmable ROM, an electrically erasable programmable ROM, a flash memory, a secure digital (SD) card, and the like. In some embodiments, the memory 120 has a storage capacity that accommodates the needs of the color mapping functions and operations described herein. The memory 120 can have any commercially-available memory capacity suitable for use in image processing applications and, in some embodiments, has a storage capacity of at least 512 Megabytes, 1 Gigabyte, 2 Gigabytes, 4 Gigabytes, 16 Gigabytes, 32 Gigabytes, 64 Gigabytes, or more. Instructions for performing any of the methods described herein can be stored in the memory 120. The memory 120 can be placed in operative communication with the processor 110, as desired, and instructions can be transmitted from the memory 120 to the processor 110 for execution, as desired. Although one memory 120 is shown in FIG. 4 for illustrated purposes only, the image processing system 100 can include any number of uniform and/or different memories 120.

The image processing system 100 can further include any hardware and/or software desired for performing the color mapping functions and operations described herein. For example, the image processing system 100 can include one or more input/output interfaces (not shown). Exemplary interfaces include, but are not limited to, universal serial bus (USB), digital visual interface (DVI), display port, serial ATA (SATA), IEEE 1394 interface (also known as Fire-Wire), serial, video graphics array (VGA), super video graphics array (SVGA), small computer system interface (SCSI), high-definition multimedia interface (HDMI), audio ports, and/or proprietary input/output interfaces. As another example, the image processing system 100 can include one or more input/output devices (not shown), for example, a button, a keyboard, a keypad, a trackball, a display, and/or a monitor. As yet another example, the image processing system 100 can include hardware for communication between components of the image processing system 100 in a wired and/or wireless manner. The communication hardware, for example, can be provided between the processor 110 and the memory 120. Exemplary communication hardware can include connectors and/or buses.

Figure 5:
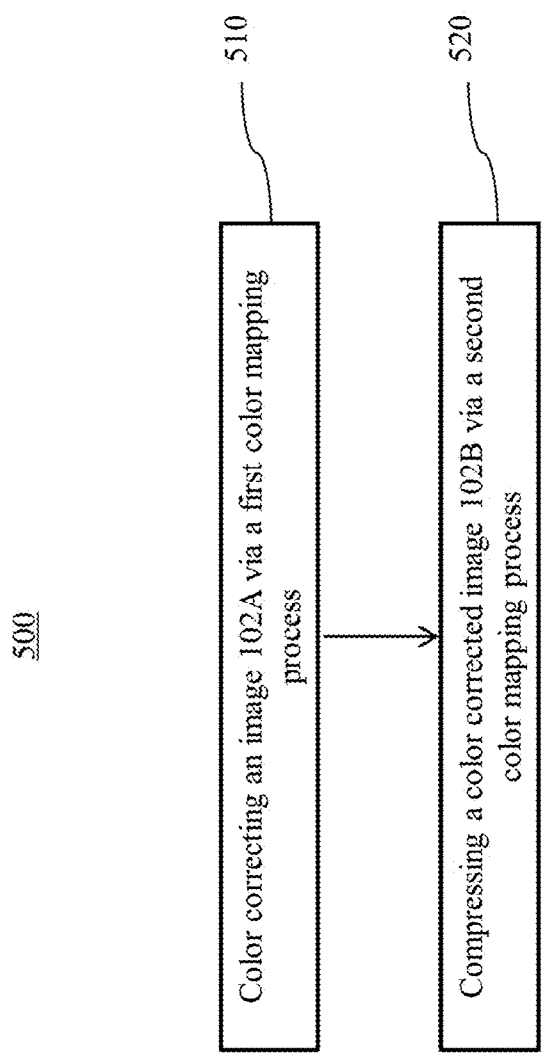
FIG. 5 is an exemplary top-level flow chart illustrating an embodiment of a method for image processing using the image processing system of FIG. 1.

FIG. 5 shows an exemplary method 500 for image processing. The method 500, for example, can be implemented via the imaging processing system 100 (shown in FIG. 1). As shown in FIG. 5, the image 102A can be color corrected, at 510, via the first color mapping process. The color corrected image 102B can be compressed, at 520, via the second color mapping process. Thereby, when the bit width of the image 102B is reduced such as via the post-processing module 400 (shown in FIG. 3), loss in the dynamic range of the image 102B can be reduced. Advantageously, when the bit width is subsequently increased, the dynamic range can be at least partially restored.

The second color mapping process can compress the color corrected image 102B in any manner. For example, the intensity values in one or more channels of the color corrected image 102B can be compressed. The channels of the color corrected image 102B can be compressed using uniform and/or different color mapping functions.

In an illustrative example, the second color mapping process can include a grayscale mapping process. In other words, during the second color mapping process, the color corrected image 102B can be converted to, or otherwise be in, a color space having at least one luma (or luminance) channel for representing an achromatic (or "black-and-white") component and at least one chroma (or chrominance) channel for representing a color component. The grayscale mapping process can be used for compressing the luma channel of the color corrected image 102B. An exemplary color space for separately representing the luma and chroma channels can include YUV, Y'UV, Y'CbCr, and/or the like.

Therefore, the second color mapping process can be performed on the luma channel. Computation can thus be simplified. Since human eyes are typically more sensitive to the achromatic component than to the color component, compressing the luma channel can advantageously be more effective than compressing other channels in ensuring improved visual effect for human eyes.

Figure 6:
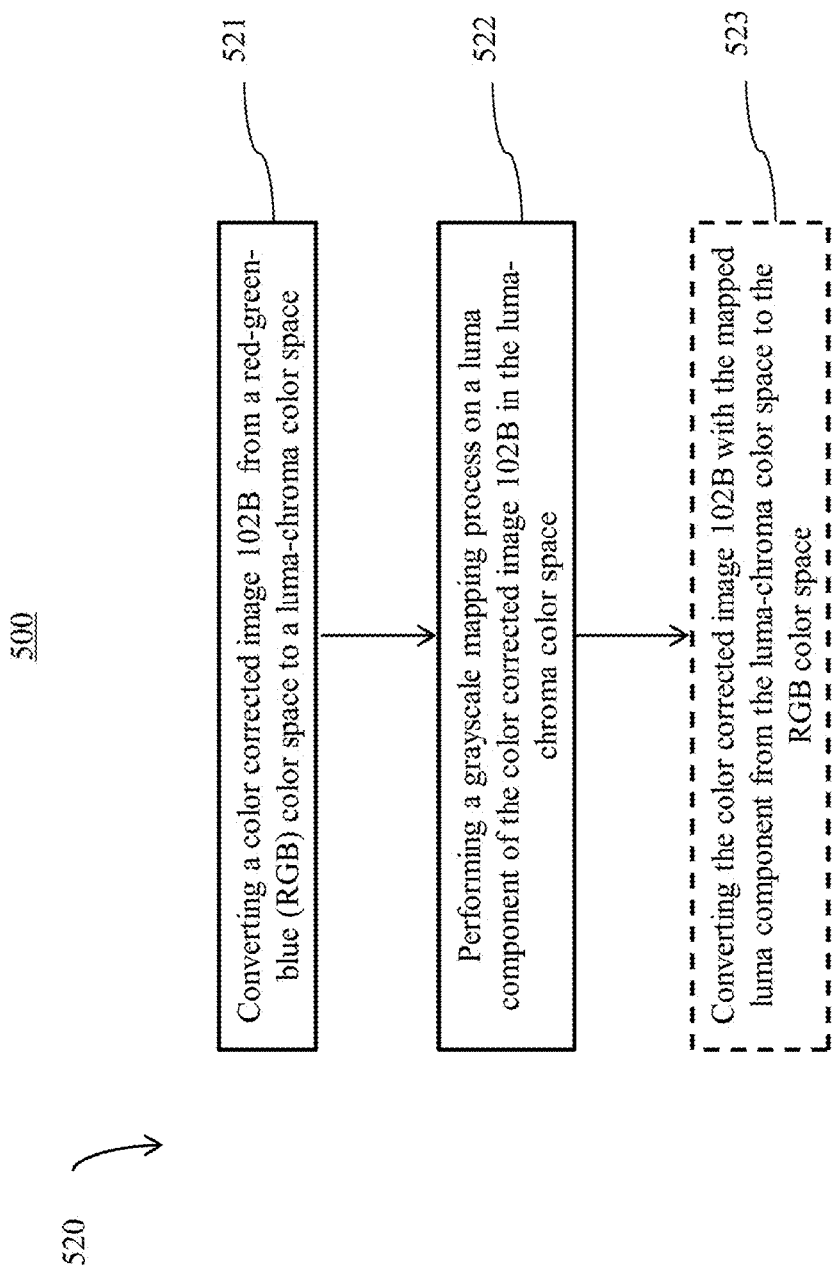
FIG. 6 is an exemplary flow chart illustrating an alternative embodiment of the method of FIG. 5, wherein the method includes converting a color corrected image to a luma-chroma color space.

FIG. 6 shows an alternative embodiment of the method 500. FIG. 6 illustrates exemplary details of one embodiment of the second color mapping process. As shown in FIG. 6, the color corrected image 102B can be converted, at 521, from the RGB color space to the luma-chroma color space. For example, the color corrected image 102B can be expressed in the YUV color space. The YUV color space can be represented by one luminance component Y representing image brightness and two chrominance components U and V representing image color. A conversion from an RGB color space with coordinates (R, G, B) to a YUV color space with coordinates (Y, U, V) entails a linear conversion, which can be represented by the following three-dimensional matrix:

$$\begin{bmatrix} Y \\ U \\ V \end{bmatrix} = \begin{bmatrix} 0.299 & 0.587 & 0.114 \\ -0.14713 & -0.28886 & 0.436 \\ 0.615 & -0.51499 & -0.10001 \end{bmatrix} \begin{bmatrix} G \\ B \\ R \end{bmatrix} \quad \text{Equation (4)}$$

Although conversions between RGB and YUV color spaces are shown and described for illustrative purposes only, the color corrected image 102B can be converted from any first predetermined color space to any other second predetermined color space as desired.

The grayscale mapping process can be performed, at 522, on the luma component of the color corrected image in the luma-chroma color space. For example, the color mapping function 310 or the function f2(x) (shown in FIG. 2) can be applied to transform the Y component.

The color corrected image 102B with the mapped luma component can be converted, at 523, from the luma-chroma color space to the RGB color space. Depending on specific subsequent functions to be implemented after the grayscale mapping process, conversion to the RGB color space (or any other color space) from the luma-chroma color space can be optional. For example, such conversion can be implemented for calibrating the grayscale mapping process as set forth with reference to FIG. 1.

Figure 7:
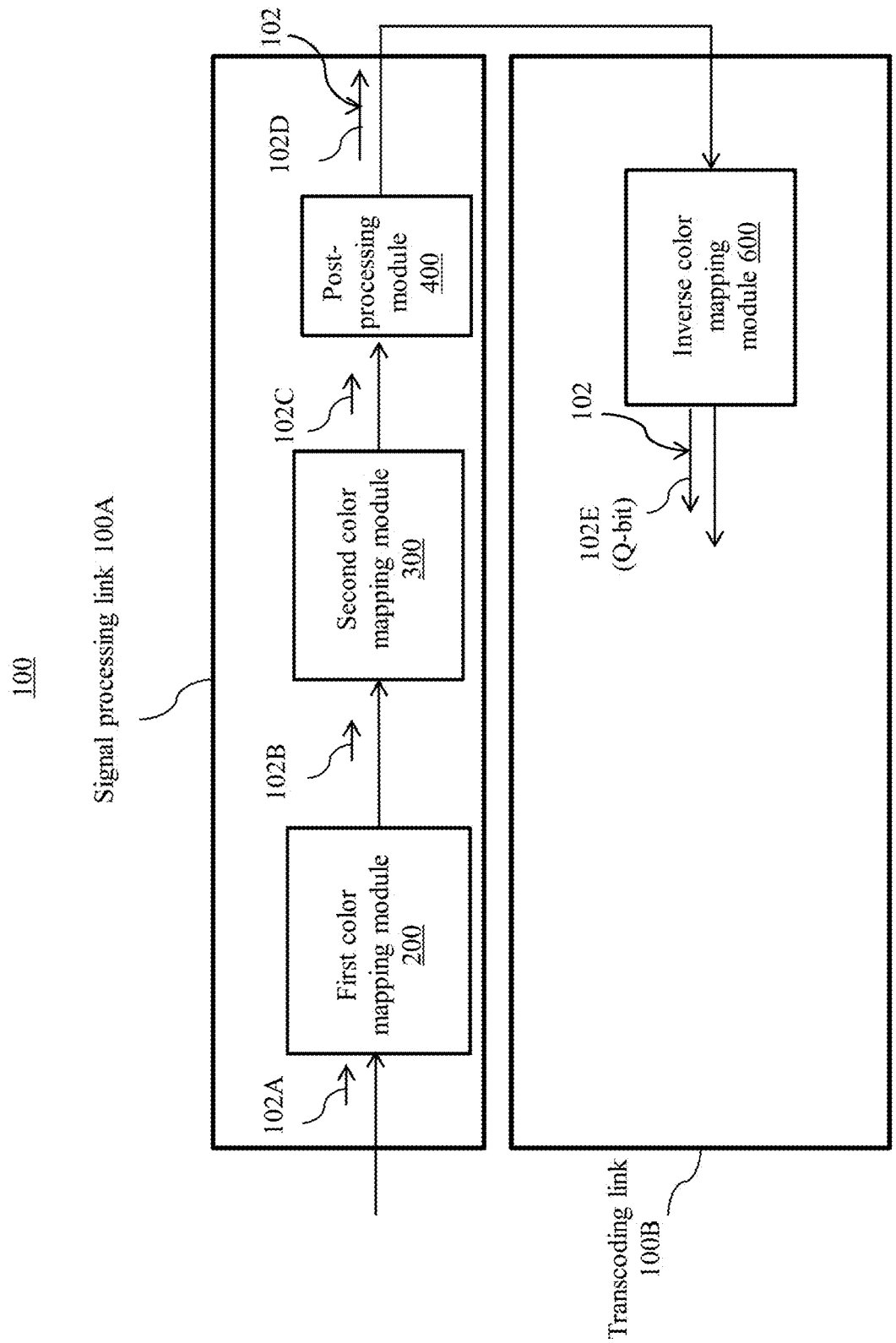
FIG. 7 is an exemplary block diagram illustrating an alternative embodiment of the image processing system of FIG. 3, wherein the image processing system includes an inverse color mapping module.

Turning to FIG. 7, the image processing system 100 is shown to include a signal processing link 100A for generating the reduced-bit-width image 102D for storage on a storage device (not shown) in a predetermined format. Exemplary format can include Joint Photographic Experts Group (JPEG), Bitmap, and/or the like. The signal processing link 100A can include the first color mapping module 200, the second color mapping module 300, and/or the post-processing module 400.

FIG. 7 shows the image processing system 100 as further including a transcoding link 100B for retrieving the reduced-bit-width image 102D from the storage device and/or processing the reduced-bit-width image 102D for display and/or editing. The transcoding link 100B can include an inverse color mapping module 600 for performing an inverse color mapping process on the image 102. The inverse color mapping module 600 can be configured to perform an inverse color mapping process to decompress the image 102.

For example, the decompressing can include at least partially decompressing the value range 312 (shown in FIG. 2) that is previously compressed by the second color mapping module 300.

In one embodiment, the signal processing link 100A and the transcoding link 100B can be at least partially integrated as one physical unit. In another embodiment, the signal processing link 100A can be physically separate from the transcoding link 100B. For example, the signal processing link 100A can be located on the digital imaging device 800 (shown in FIG. 10) while the transcoding link 100B can be located on a computer system (not shown) for presenting and/or editing the image 102 captured by the digital imaging device 800.

Figure 8:
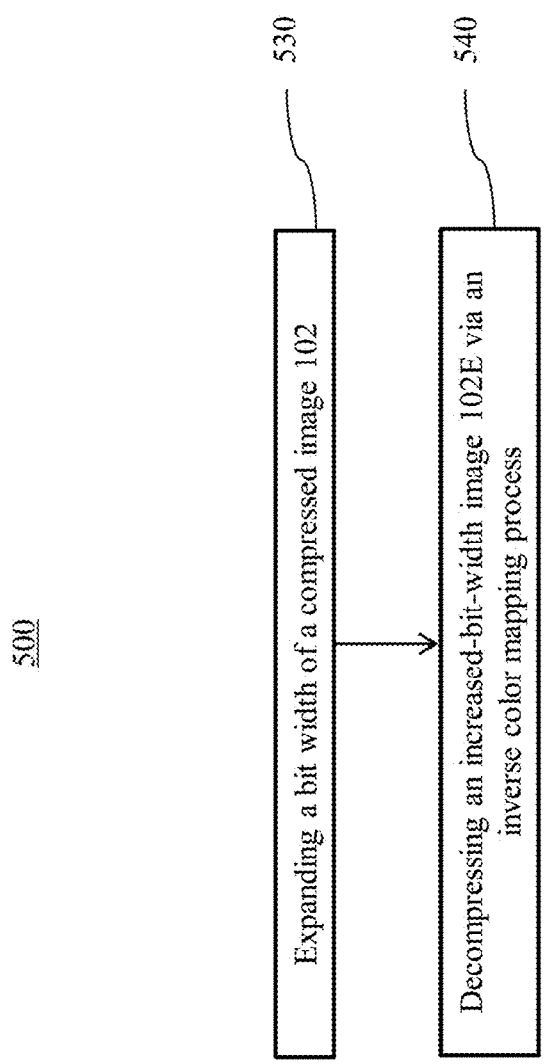
FIG. 8 is an exemplary flow chart illustrating another alternative embodiment of the method of FIG. 5, wherein the method includes expanding a bit width of a compressed image.

FIG. 8 shows another alternative embodiment of the method 500 on the imaging processing system 100 (shown in FIG. 7). As shown in FIG. 8, the bit width of the compressed image 102 can be expanded, at 530, via an inverse color mapping process. The compressed image 102 can include the image 102 at any stage in the imaging processing system 100 after being compressed by the second color mapping module 300 shown in FIG. 7. For example, the compressed image 102 can include the reduced-bit-width image 102D shown in FIG. 7.

The transcoding link 100B can retrieve the image 102 from the storage device (not shown) and/or receive the image 102 via transmission. The image 102 can be in the P-bit format. The inverse color mapping module 600 can increase the bit width of the image. So the increased-bit-width image can be in a Q-bit format, wherein Q can be any predetermined integer. Q can be greater than P. For example, the increased (Q-P) bits can be added to be the least significant bits of the image 102. The image 102 having the bit width increased by the inverse color mapping module 600 can also be referred to as an increased-bit-width image 102E.

The increased-bit-width image 102E can be decompressed, at 540. Decompression of the increased-bit-width image 102E can occur, for example, during the inverse color mapping process. The inverse color mapping process can include an inverse process of the second color mapping process. In other words, the inverse color mapping process can include a transformation based on an inverse function of the color mapping function 310 (shown in FIG. 2).

By using the inverse color mapping process, the value range 312 (shown in FIG. 2) of the decompressed image can be at least partially expanded. Advantageously, on a device having a capability of displaying and/or editing at a high bit width, the dynamic range of the image can be expanded to utilize the additional bit width, and the limitation posed by the bit width of the storage device can be reduced.

Although FIG. 8 shows expanding the bit width and decompressing as being performed sequentially for illustrative purposes only, expanding the bit width and decompressing can be performed in any order and/or simultaneously, without limitation.

Figure 9:
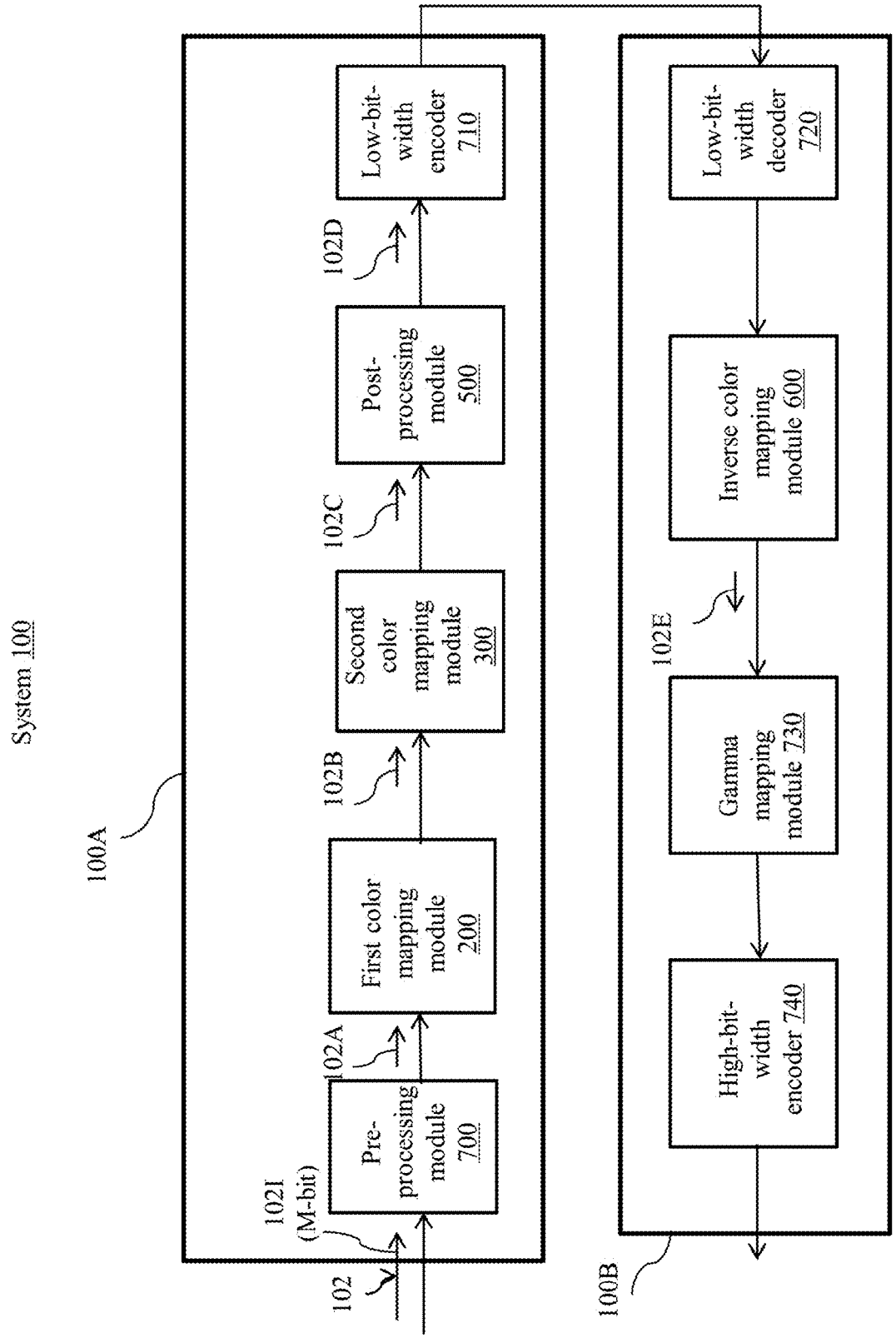
FIG. 9 is an exemplary block diagram illustrating an alternative embodiment of the image processing system of FIG. 7, wherein the image processing system includes a pre-processing module.

The image processing system 100 can include additional and/or alternative components. Turning to FIG. 9, for example, the signal processing link 100A is shown as including a pre-processing module 700. The pre-processing module 700 can perform selected operations on the image 102. The image 102 received by the pre-processing module 700 can be also referred to as an original image 1021. For example, an image sensor 810 (shown in FIG. 10) can acquire the image 102 in a Bayer pattern. The pre-processing module 700 can perform, for example, black-level correction, dark-corner correction, dead-pixel correction, white balancing correction, color difference suppression, Bayer denoising, demosaicing operations, and/or image sharpening/softening operations.

Additionally and/or alternatively, the signal processing link 100A can include an optional low-bit-width encoder 710 for encoding the reduced-bit-width image 102D into a format that enables one or more subsequent operations for the reduced-bit-width image 102D. In one embodiment, the low-bit-width encoder 710 can encode the reduced-bit-width image 102D into a format for storing the reduced-bit-width image 102D on a storage device at P bit width. Additionally and/or alternatively, the low-bit-width encoder 710 can encode the reduced-bit-width image 102D into a format for transmission. For example, the signal processing link 100A can be located on a mobile platform such as a UAV. In that case, the low-bit-width encoder 710 can encode the reduced-bit-width image 102D into a suitable format to be transmitted wirelessly, or in a wired manner, to a remote device via a communication module (such as a transceiver, or an RF transmitter) aboard the mobile platform. The low-bit-width encoder 710 can conform to any suitable image encoding standard. An exemplary standard can include H.264 High Profile Level 5.1, YCbCr 4:2:0, 8-bit.

Additionally and/or alternatively, the transcoding link 100B can include a low-bit-width decoder 720 for decoding the image 102 into a format that the inverse color mapping module 600 can process. The low-bit-width decoder 720 can conform to any decoding standard compatible with the low-bit-width encoder 710.

Additionally and/or alternatively, the transcoding link 100B can include an optional high-bit-width encoder 740 for encoding the image 102 into a format for presentation and/or editing on a display device (not shown) at Q bit width. The low-bit-width encoder 710 can conform to any suitable image encoding standard. An exemplary standard can include H.264 High 4:2:2 Profile (122), 10-bit.

Additionally and/or alternatively, the transcoding link 100B can include an optional gamma mapping module 730 for performing a gamma correction on the image 102. The gamma correction can include applying a nonlinear operation on at least one channel of the image 102 for the display device to render the image 102 in a manner that conforms to a predetermined display standard. An exemplary display standard can include Rec.709 (or International Telecommunication Union Radiocommunication Sector (ITU-R) Recommendation BT.709).

The nonlinear operation can be predetermined at least partially based on the first color mapping process, the second color mapping process, and/or the color display standard of the display device. For example, exemplary gamma correction can use the following power law expression:

$$f(x) = Hx^\gamma \qquad \text{Equation (5)}$$

where $\gamma$ is a gamma value and $H$ is a numerical constant. Exemplary gamma values $\gamma$ can be 2.2, 1.8, or any other numerical values.

Figure 10:
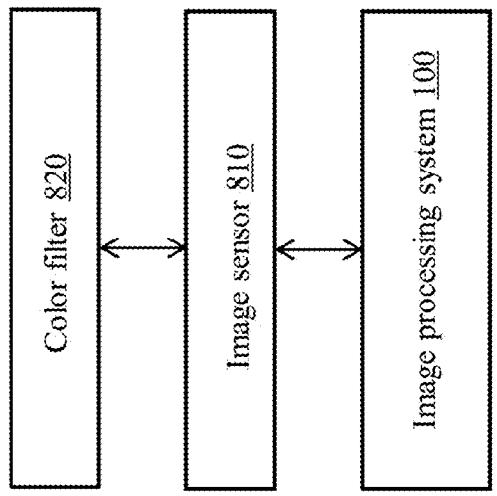
FIG. 10 is an exemplary block diagram illustrating an embodiment of a digital imaging device including the image processing system of FIG. 1.

FIG. 10 shows an exemplary digital imaging device 800. The digital imaging device 800 can include an image sensor 810 for capturing the image 102 (shown in FIG. 9). The digital imaging device 800 can include the image processing system 100 in communication with the image sensor 810 for processing the image 102.

The image sensor 810 can perform the function of sensing light and converting the sensed light into electrical signals that can be rendered as an image. Various image sensors 810 can be suitable for use with the disclosed systems and methods, including, but not limited to, image sensors 810 used in commercially-available cameras and camcorders. Suitable image sensors 810 can include analog image sensors (for example, video camera tubes) and/or digital image sensors (for example, charge-coupled device (CCD), complementary metal-oxide-semiconductor (CMOS), N-type metal-oxide-semiconductor (NMOS) image sensors, and hybrids/variants thereof). Digital image sensors can include, for example, a two-dimensional array of photosensor elements that can each capture one pixel of image information. The resolution of the image sensor 810 can be determined by the number of photosensor elements. The image sensor 810 can support any commercially-available image resolution and, in some embodiments, has a resolution of at least 0.1 Megapixels, 0.5 Megapixels, 1 Megapixel, 2 Megapixels, 5 Megapixels, 10 Megapixels, or an even greater number of pixels. The image sensor 810 can have specialty functions for use in various applications such as thermography, creation of multi-spectral images, infrared detection, gamma detection, x-ray detection, and the like. The image sensor 810 can include, for example, an electro-optical sensor, a thermal/infrared sensor, a color or monochrome sensor, a multi-spectral imaging sensor, a spectrophotometer, a spectrometer, a thermometer, and/or an illuminometer.

The digital imaging device 800 can include a color filter 820 coupled with the image sensor 810. The color filter 820 of FIG. 10 can separate and/or filter incoming light based on color and direct the separated/filtered light onto the appropriate photosensor elements of the image sensor 810. For example, the color filter 820 can include a color filter array that passes red, green, or blue light to selected pixel sensors to form a color mosaic (not shown). The layout of different colors on the color mosaic can be arranged in any convenient manner, including a Bayer pattern. Once a color mosaic is formed, a color value of each pixel can be interpolated using any of various demosaicing methods that interpolate missing color values at each pixel using color values of adjacent pixels. As an alternative to filtering and demosaicing, the image sensor 810 can include an array of layered pixel photosensor elements that separates light of different wavelengths based on the properties of the photosensor elements. In either case, an image can be acquired by the image sensor 810 as intensity values in each of a plurality of color channels at each pixel.

The color filter 820, the image sensor 810, and/or the image processing system 100 can be at least partially integrated as one physical unit. In one example, the digital imaging device 800 can include a digital still and/or motion picture camera.

In one embodiment, the digital imaging device 800 can include the signal processing link 100A (shown in FIG. 7). In another embodiment, the digital imaging device 800 can include the signal processing link 100A and at least partially include the transcoding link 100B (shown in FIG. 7).

Figure 11:
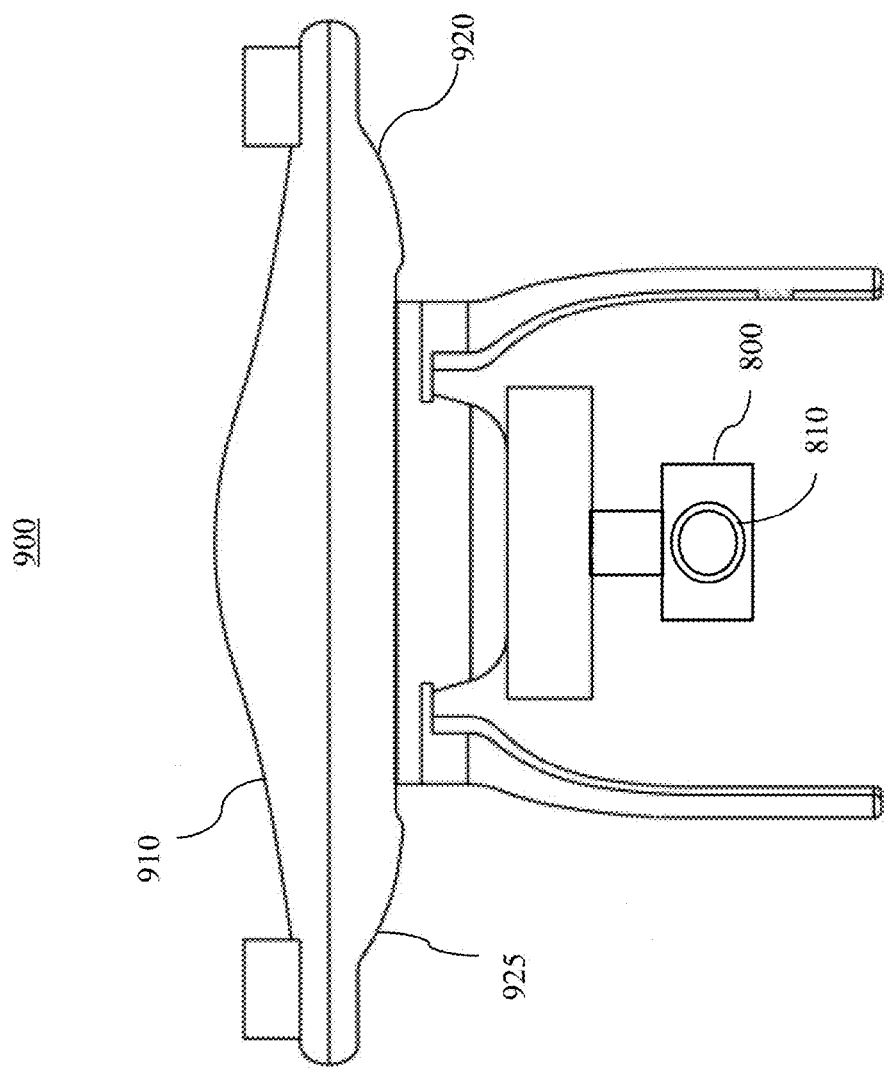
FIG. 11 is an exemplary block diagram illustrating an embodiment of an unmanned aerial vehicle (UAV) including the digital imaging device of FIG. 10 aboard.

Turning now to FIG. 11, an exemplary embodiment of the digital imaging device 800 is shown, wherein the digital imaging device 800 is shown as being installed aboard a mobile platform, such as an unmanned aerial vehicle (UAV) 900. A UAV 900, colloquially referred to as a "drone," can include an aircraft without an onboard human pilot and whose flight can be controlled autonomously and/or by a remote pilot. The digital imaging device 800 can be suitable for installation aboard any of various types of UAVs 900, including, but not limited to, rotorcraft, fixed-wing aircraft, and hybrids thereof. Suitable rotorcraft include, for example, single rotor, dual rotor, trirotor, quadrotor (quadcopter), hexarotor, and octorotor rotorcraft. The digital imaging device 800 can be installed on various portions of the UAV 900. For example, the digital imaging device 800 can be installed within a fuselage 910 of the UAV 900. Alternatively, the digital imaging device 800 can be mounted onto an exterior surface 920 (for example, on the underside 925) of the UAV 900. Furthermore, the various components of the digital imaging device 800 can be installed on the same portion, and/or different portions, of the UAV 900. For example, the image sensor 810 of the digital imaging device 800 can be mounted on the exterior surface 920 to facilitate image acquisition; while, the image processing system 100 advantageously can be installed within the fuselage 910 for protection against wear and tear. Likewise, the various components of the image processing system 100 can be installed on the same portion, and/or different portions, of the UAV 900. Although shown and described with respect to a UAV 900 for purposes of illustration only, the digital imaging device 800 can include, or be mounted on, any type of mobile platform. Exemplary suitable mobile platforms include, but are not limited to, bicycles, automobiles, trucks, ships, boats, trains, helicopters, aircraft, various hybrids thereof, and the like.

Figure 12:
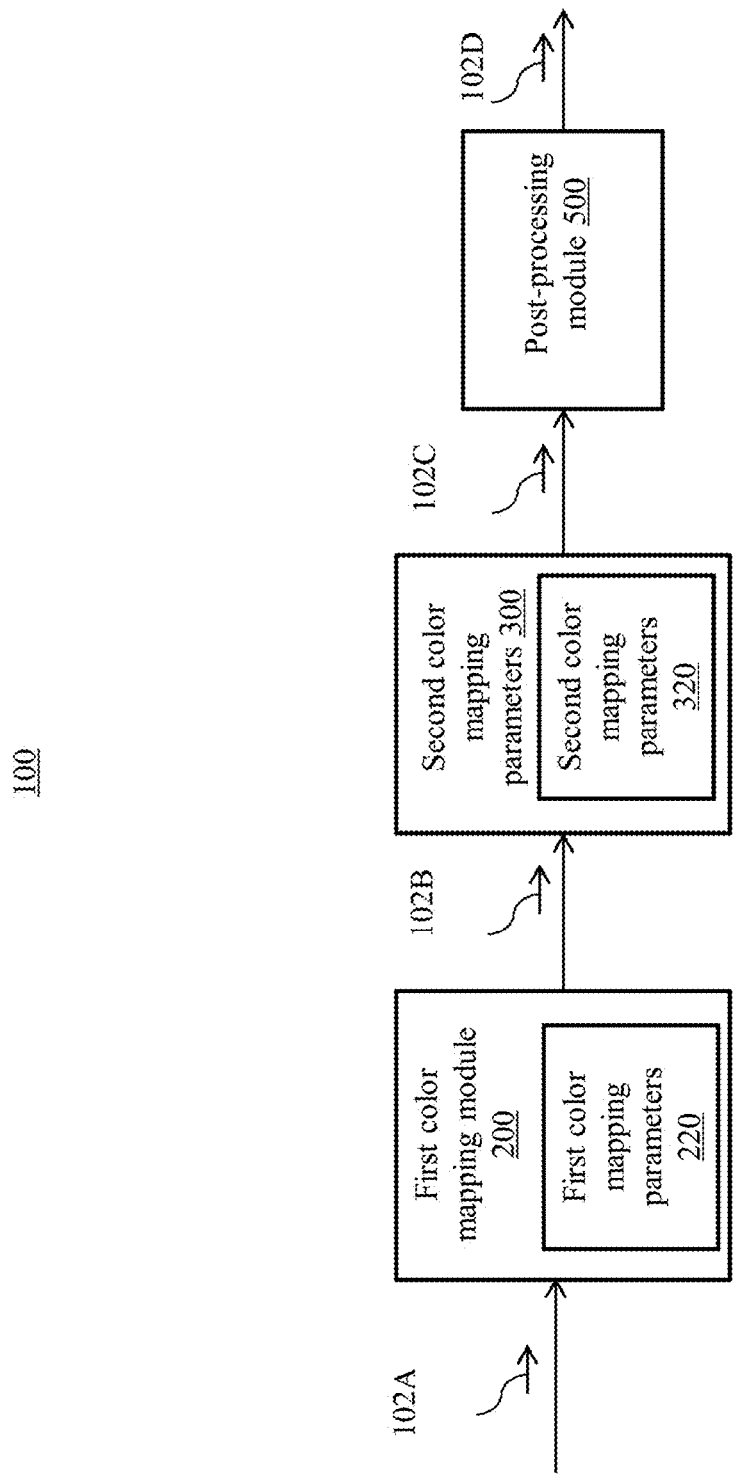
FIG. 12 is an exemplary block diagram illustrating another alternative embodiment of the image processing system of FIG. 3, wherein the first and second color mapping modules perform color mapping processes based on first and second color mapping parameters, respectively.

Turning now to FIG. 12, the first color mapping module 200 and the second color mapping module 300 are shown as storing first color mapping parameters 220 and second color mapping parameters 320, respectively. The first color mapping module 200 can perform the first color mapping process on the image 102A based on the first color mapping parameters 220. The second color mapping module 300 can perform the second color mapping process on the color corrected image 102B based on the second color mapping parameters 320. In one embodiment, the second color mapping parameters 320 can include parameters of the color mapping function 310 (shown in FIG. 2). Exemplary second color mapping parameters 320 can thus include the numerical parameters in Equation (3).

The color mapping parameters 220, 320 can be calibrated or otherwise determined at least partially based on configuration of the digital imaging device 800 (shown in FIG. 10) and/or standard of the display device (not shown) for displaying the image 102. The following embodiments illustrate exemplary methods for calibrating the color mapping parameters 220, 320.

Figure 13:
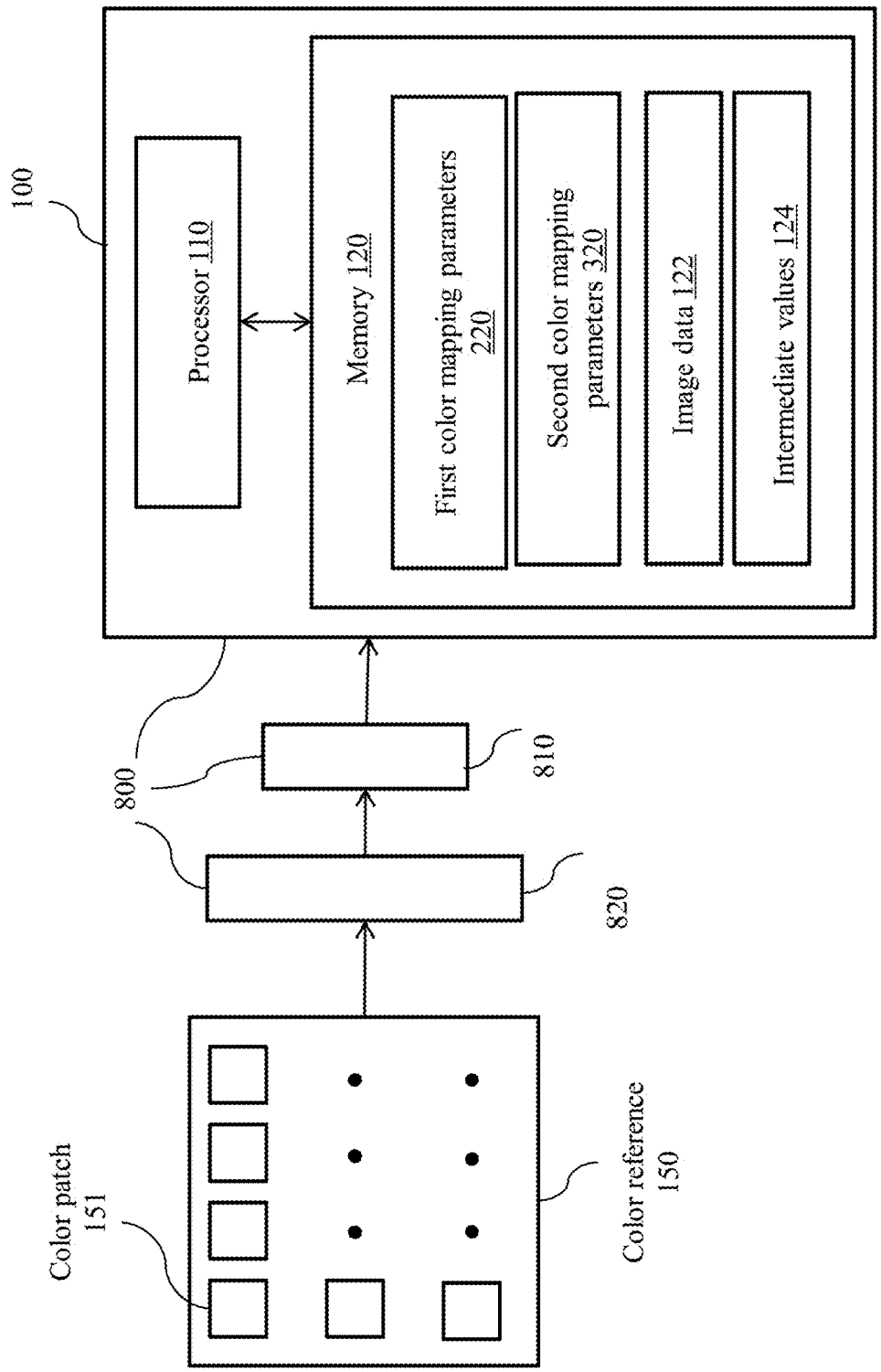
FIG. 13 is an exemplary block diagram illustrating an alternative embodiment of the digital imaging device of FIG. 10, wherein the digital imaging device can calibrate first and second color mapping parameters.

Turning now to FIG. 13, an exemplary embodiment of the digital imaging device 800 is shown. The memory 120 of the image processing system 100 is shown as storing the first color mapping parameters 220 and/or the second color mapping parameters 320, pre-mapping and post-mapping image data 122, and intermediate values 124 produced during various color mapping parameters calibration functions and operations described herein.

The digital imaging device 800 can acquire an image (not shown) of a color reference 150 to perform calibration of the first color mapping parameters 220 and/or the second color mapping parameters 320. In some embodiments, the color reference 150 can have a reference color value Cref that is known or that can be otherwise determined in advance, making the color reference 150 suitable for use as a color standard. Stated somewhat differently, the reference color value Cref can be a property of the color reference 150 that is independent of how the color reference 150 is imaged. The reference color value Cref can be designated based on an average human perception of the color reference 150. The reference color value Cref can thus serve as an objective measure how a color imaged by the image sensor 810 can be corrected so as to match the average human perception.

In some embodiments, the color reference 150 can be homogeneous in color. Flatness of the color reference 150 can avoid variations attributable to differential light scattering. The optical properties of the color reference 150 need not be ideal for purposes of performing color correction as long as the optical properties do not interfere with imaging the color reference 150. The color reference 150 can be made of one or more of a variety of materials such as plastic, paper, metal, wood, foam, composites thereof, and other materials. Furthermore, the color, reflectance, and/or other optical properties of the color reference 150 can advantageously be calibrated as desired using an appropriate paint or other coating. In some embodiments, the color reference 150 can advantageously include multiple color patches 151, each of which has a different reference color value Cref. This embodiment enables multiple color references 150 to be imaged at the same time, reducing the number of image capture operations for color correction. This embodiment is particularly suitable when a large number of color references 150 are to be imaged in order to calibrate the color mapping parameters 220, 320 with greater accuracy. An Exemplary color reference 150 can be commercially available and/or custom-made. Commercially available color references 150 include, for example, MacBeth ColorChecker available from X-Rite, Inc. of Grand Rapids, Mich., and MacBeth ColorChecker Semi Gloss (SG) also available from X-Rite, Inc.

Once acquired by the image sensor 810, the image can be converted between color spaces as desired for processing and/or calibration. Although images acquired by the image sensor 810 in various examples herein are described in an RGB (red, green, and blue) color space for illustrative purposes only, the images can be acquired in other color spaces, as well. The color space in which images are acquired depends generally on the properties of the image sensor 810 and any color filters 820. Furthermore, the color space in which an image is acquired need not be three-dimensional but can have any number of dimensions as desired to capture the spectral composition of the image. The number of dimensions can depend on the number of color channels of the image sensor 810. The color space of an acquired image can be one-dimensional, two-dimensional, three-dimensional, four-dimensional, five-dimensional, or more.

Figure 14:
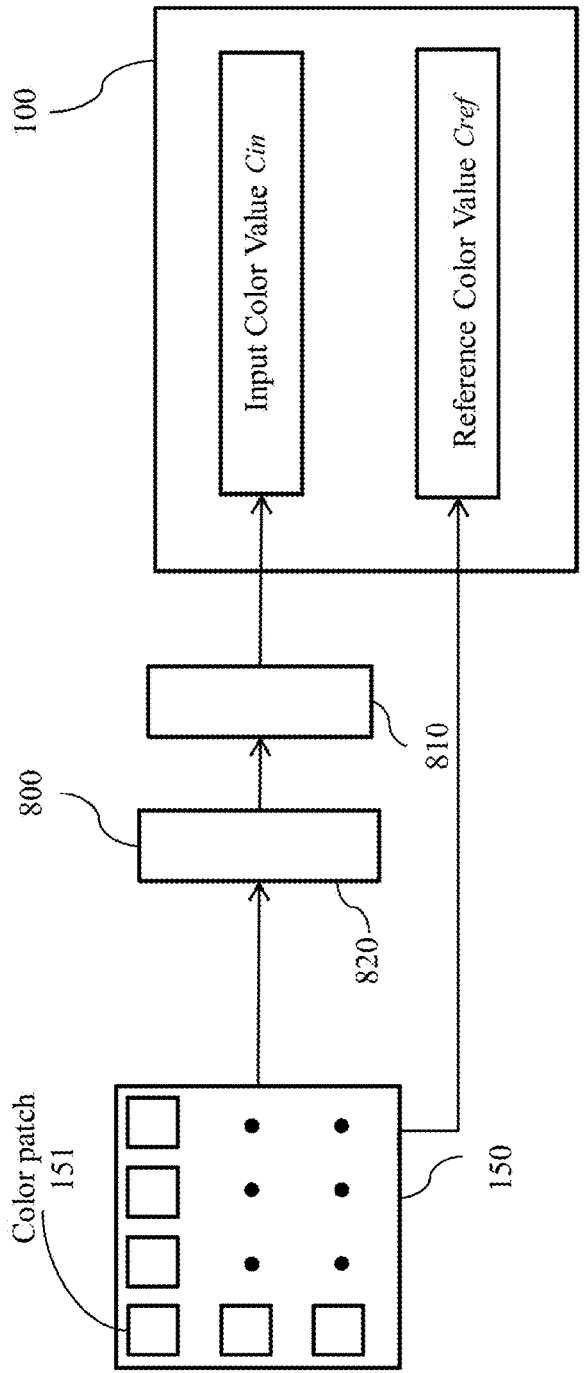
FIG. 14 is an exemplary block diagram illustrating an alternative embodiment of the digital imaging device of FIG. 13, wherein the digital imaging device obtains input color values of a color reference.

FIG. 14 shows an alternative embodiment of the digital imaging device 800. The digital imaging device 800 of FIG. 14 includes the image processing system 100, which is shown as obtaining several inputs for calibration of the color mapping parameters 220, 320. Without limitation, the image sensor 810 can acquire the image of the color reference 150. The image then can be passed to the image processing system 100, which can obtain an input color value Cin of the image. The input color value Cin can represent a pre-processed value that reflects the image acquisition properties of the image sensor 810, filtering properties of the image filter 820, as well as any other optical properties of the digital imaging device 800.

In one embodiment, the input color value Cin can be transformed from the color space of the color reference image to any other selected color space. For example, the input color value Cin can be transformed from an RGB color space to a CIE XYZ color space. Additionally and/or alternatively, the color values in the CIE XYZ color space can be transformed to a CIE L*a*b* color space. Such transformations can be performed on the processor 110 (shown in FIG. 13) of the image processing system 100.

Similarly, the color correction apparatus 100 can obtain a reference color value Cref that corresponds to the input color value Cin for color reference 150. If desired, the reference color value Cref can be transformed into the CIE L*a*b* color space. In some embodiments, the reference color value Cref advantageously can be directly inputted into the image processing system 100 in the CIE L*a*b* color space, thereby making the transformation step unnecessary.

Figure 15:
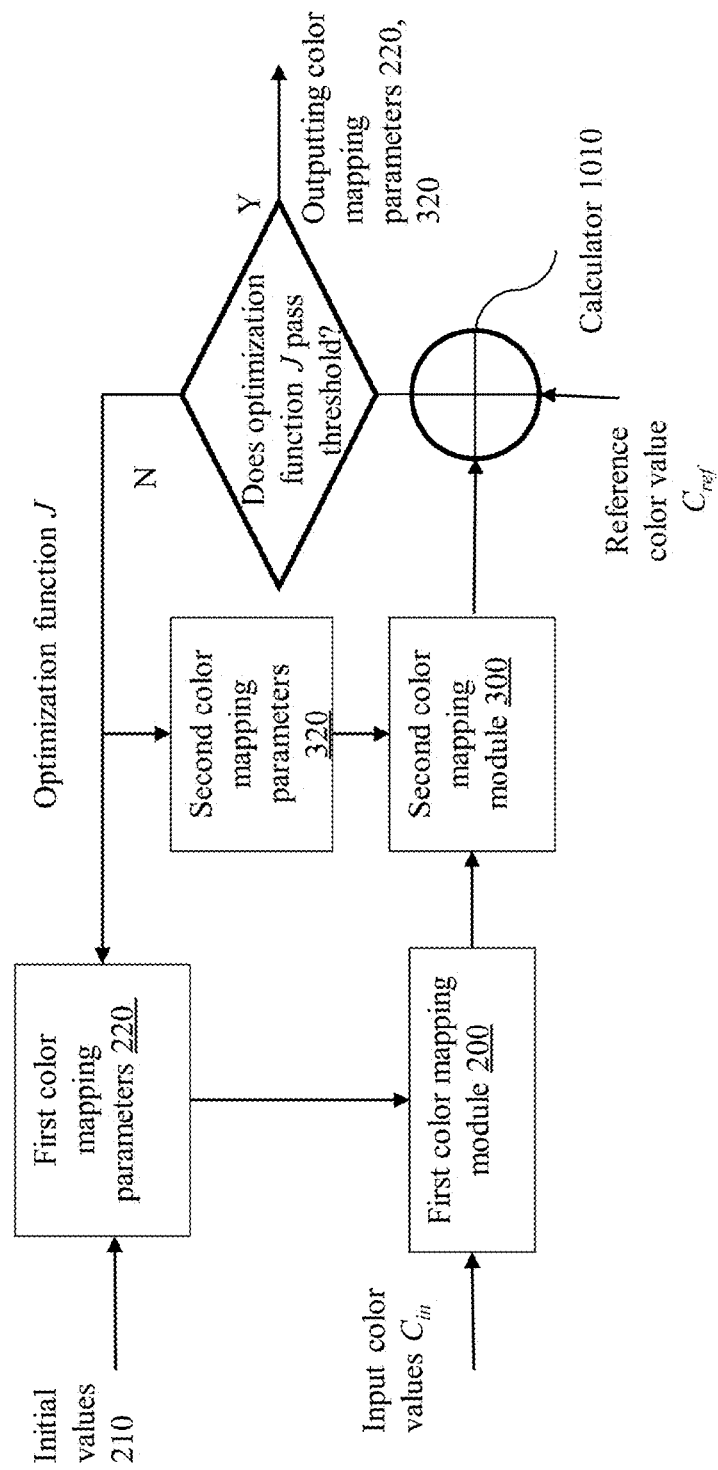
FIG. 15 is an exemplary block diagram illustrating an embodiment of a calibration framework using the digital imaging device of FIG. 14.

Turning to FIG. 15, an exemplary embodiment of a calibration framework 1000 is shown. The calibration framework 1000 advantageously can be applied to calibrating the color mapping parameters 220, 320 for the digital imaging device 800 shown in FIG. 13. Input color values Cin and reference color values Cref are obtained for each of the plurality of color references 150 shown in FIG. 13. The input color (or pre-processing) values Cin for the color references 150 can be processed using current values of the color mapping parameters 220, 320 to obtain post-mapping input color values $\hat{C}_{in}$ (also referred to as color mapped input color values $\hat{C}_{in}$). This operation can be represented as:

$$\hat{C}_{in}=CC(C_{in}) \qquad \text{Equation (6)}$$

where the operation CC represents the first and second color mapping processes performed by the first color mapping module 200 and the second color mapping module 300. The specific implementation of the operation CC can depend on the underlying form of the color mapping parameters 220, 320. In one embodiment, the first color mapping parameters 220 and/or the second color mapping parameters 320 can take the form of a matrix having dimensions n×m, where m is dimensionality of the pre-mapping color value and n is the dimensionality of the post-mapping color value. In this embodiment, the operation CC will take the form of a matrix multiplication that transforms an m-dimensional color value vector into an n-dimensional color value vector. In some embodiments, the pre-mapping color value and the post-mapping color value can have the same dimensionality, in which case CC can take the form of a square matrix. In some embodiments, the pre-mapping color value and the post-mapping color value can each be three-dimensional (for example, for color values in the RGB, CIE XYZ, CIE L*a*b*, and LUV color spaces), in which case CC can take the form of a 3×3 matrix. In one embodiment, the first color mapping parameters 220 can be in the form of an n×m matrix and can advantageously allow decreased memory usage.

In another embodiment, the first color mapping parameters 220 and/or the second color mapping parameters 320 can take the form of numerical parameters in a mathematical function that has a predetermined form.

In yet another embodiment, the first color mapping parameters 220 and/or the second color mapping parameters 320 can take the form of a look-up table (LUT) indexed in m dimensions that contains ordered m-tuples (a1, a2, . . . , am) each mapping to an n-dimensional vector, where m is dimensionality of the pre-mapping color value and n is the dimensionality of the post-mapping color value. In some embodiments, the look-up table is three-dimensional, that is, indexed in three dimensions. An advantage of using a look-up table to implement the first color mapping parameters 220 and/or the second color mapping parameters 320 is that a look-up table can account for a non-linear relationship between a pre-mapping color value and a post-mapping color value. Furthermore, since the entries in the look-up table are discrete, interpolation operations can be readily performed when pre-mapping color values fall in between discrete entries. Such interpolation operations can include finding look-up table entries that have the closest distance (for example, Euclidian distance) to the pre-mapping color value, and interpolating a corrected color value using the closest look-up table entries. For example, linear interpolations can be performed for one-dimensional look-up tables, and multi-linear interpolations can be performed for look-up tables in higher dimensions. In this embodiment, the color mapping operation CC can take the form of a look-up operation in the look-up table, followed by an interpolation operation, if desired. The first color mapping parameters 220 and/or the second color mapping parameters 320 can be implemented in multiple ways simultaneously; for example, a combination of a matrix and a look-up table can be used.

The post-mapping input color values $\hat{C}_{in}$ can be compared to the reference color values Cref, and the color correction error ecolor can be computed via an error calculator 1010 based on the comparison. For example, where the post-mapping input color values $\hat{C}_{in}$ and reference color values Cref are represented in a CIE L*a*b* color space, the color correction error ecolor can be expressed as:

$$e_{color} = \sqrt{\Sigma_{j}^{j \in \{L^*a^*b^*\}} (C_{in\_j} - \hat{C}_{in\_j})^2}$$

Equation (7)

where $C_{in\_j}$ and $\hat{C}_{in\_j}$ represent the jth component of the reference color values Cref and the post-mapping input color values $\hat{C}_{in}$, respectively. Stated somewhat differently, the color correction error ecolor can include the Euclidian distance between the post-process input color values $\hat{C}_{in}$ and the reference color values Cref in the color space in which the color values are represented. Where the color correction error ecolor is to be determined over multiple color references 150 (or, equivalently, over multiple color patches 151 of a given color reference 150), the color correction error ecolor can be taken as a weighted and/or unweighted average over the color patches 151.

An optimization function J can be computed based on the color correction error ecolor. For example, an exemplary optimization function J can be the following:

$$J = e_{color}$$

Equation (8)

Whether the optimization function J passes a threshold can be determined. For example, whether the optimization function J is below a threshold can be determined. The threshold can be a pre-determined value that indicates the operation CC can yield the post-process input color values $\hat{C}_{in}$ within a pre-determined distance from the reference color values Cref in the color space.

When the optimization function J passes the threshold, the color mapping parameters 220, 320 can be outputted from the calibration framework 1000 to be used by the image processing system 100 (shown in FIG. 12) for mapping subsequently-captured images.

When the optimization function J does not pass the threshold, the optimization function J can be fed back for optimizing the first color mapping parameters 220. Any of various optimization processes can be used in the optimization. In one example, the optimization process can include two stages. A first-stage optimization process can include a genetic process, a simulated annealing method, and/or any other non-greedy methods that avoid local optima. The first-stage optimization process can be applied from initial values 210 as a starting point to obtain further optimized values for the first color mapping parameters 220. The second-stage optimization process can find the local optimum value. For example, direct optimization methods can be suitable for the second-stage optimization process. Exemplary direct optimization methods include, but are not limited to, gradient descent methods.

In one embodiment, the optimization function J can be fed back for optimizing the second color mapping parameters 320 in a similar manner as the first color mapping parameters 220. In another embodiment, the second color mapping parameters 320 can be fixed at a set of initial set points during iterative optimization of the first color mapping parameters 220. When the number of iterations reaches a predetermined limit while the optimization function J still does not pass the threshold, the second color mapping parameters 320 can be adjusted. The first color mapping parameters 220 can be iteratively optimized using the adjusted second color mapping parameters 320. In either case, the color mapping parameters 220, 320 can jointly be optimized for the optimization function J to pass the threshold. Stated somewhat differently, the calibration frame work 1000 can provide a joint optimization process.

Figure 16:
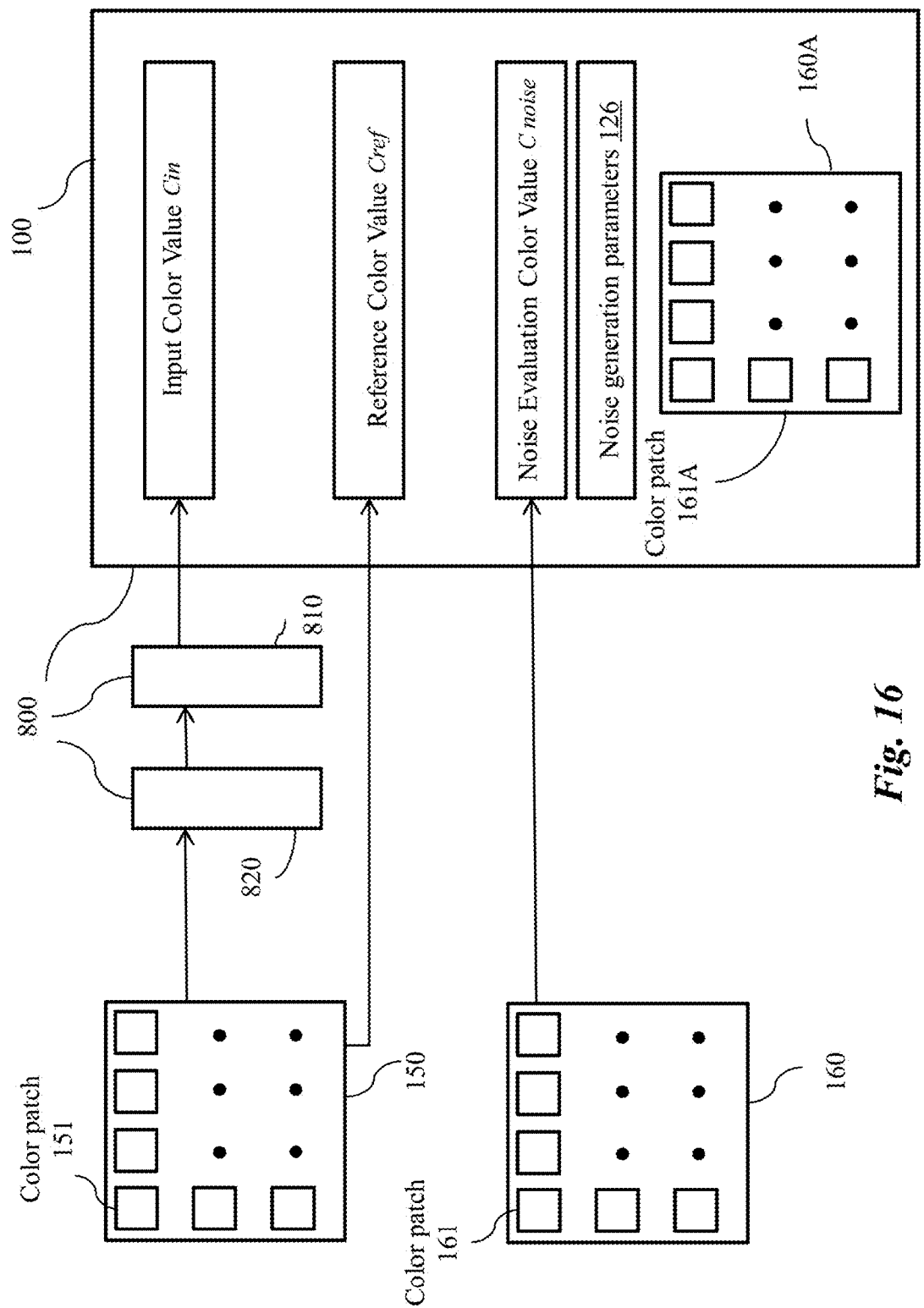
FIG. 16 is an exemplary block diagram illustrating another alternative embodiment of the digital imaging device of FIG. 13, wherein the digital imaging device obtains noise evaluation color values of a noise evaluation image.

Turning now to FIG. 16, another alternative embodiment of the digital imaging device 800 is shown. In FIG. 16, the image processing system 100 is shown as obtaining noise evaluation color values Cnoise from a noise evaluation image 160 having a color noise for evaluating noise reduction. The noise evaluation image 160 can be any image containing noise. As color correction tends to amplify noise, the noise evaluation image 160 can be used to calibrate the color mapping parameters 220, 320 in order to limit noise amplification. Stated somewhat differently, the noise evaluation image 160 can used to evaluate how noise is amplified with a given set of color mapping parameters 220, 320 (shown in FIG. 13), and thereby select a set of color mapping parameters 220, 320 with reduced noise amplification. In one embodiment, the noise evaluation color values Cnoise can be transformed into the YUV color space. The transformation can be performed, for example, using the linear transformation from the RGB color space to the YUV color space shown above in Equation (5). This transformation can be performed using the processor 110 (shown in FIG. 13) of the image processing system 100.

In one embodiment, the noise evaluation image 160 can be an image acquired by the image sensor 810 with or without filtering through the color filter 820. That is, the image sensor 810 can receive incoming light with or without having the color filter 820 filter the incoming light. In some embodiments, the noise evaluation image 160 can include an image of the color reference 150. Imaging the color reference 150 can advantageously allow the simultaneous determination of the input color values Cin and the noise evaluation color values Cnoise.

Alternatively and/or additionally, the noise evaluation image 160 can include a virtual noise evaluation image 160A. The virtual noise evaluation image 160A can be generated by the color correction apparatus 100 using a pre-determined set of noise generation parameters 126. The noise generation parameters 126 can, for example, reflect the distribution of the noise that is generated virtually (for example, Poisson or Gaussian noise). The specific noise generation parameters 126 can reflect or otherwise represent the types of noise that the image processing system 100 can be expected to encounter in usage. A virtual noise evaluation image 160A can be used because the evaluation of noise amplification does not require information about the color of an underlying object that is imaged. Instead, an arbitrary image containing noise can be evaluated for how the noise of that image would be amplified under a given set of color mapping parameters 220, 320. For example, the noise evaluation color values Cnoise of the virtual noise evaluation image 160A can be represented as follows:

$$C_{noise} = C_{noise\_free} + n \qquad \text{Equation (9)}$$

where $C_{noise\_free}$ represents the color of the virtual noise evaluation image 160A before noise is added, and n represents the noise added.

Once the inputs for color mapping parameter calibration (for example, input color values Cin, reference color values Cref, and noise evaluation color values Cnoise) are obtained by the image processing system 100, these inputs can be stored for later use by the image processing system 100. The inputs, for example, can be stored in the memory 120 shown in FIG. 13. For example, the inputs for color mapping parameter calibration can be obtained as part of an initialization process for a new digital imaging device 800 prior to usage. The inputs for color correction parameter calibration can be stored in the memory 120 and called upon periodically to re-calibrate the first color mapping parameters 220 and/or second color mapping parameters 320 as desired (for example, as image response characteristics of the digital imaging device 800 change after wear and tear). The inputs for color correction parameter calibration can be, but do not need to be, re-obtained for each new color mapping parameter calibration.

Figure 17:
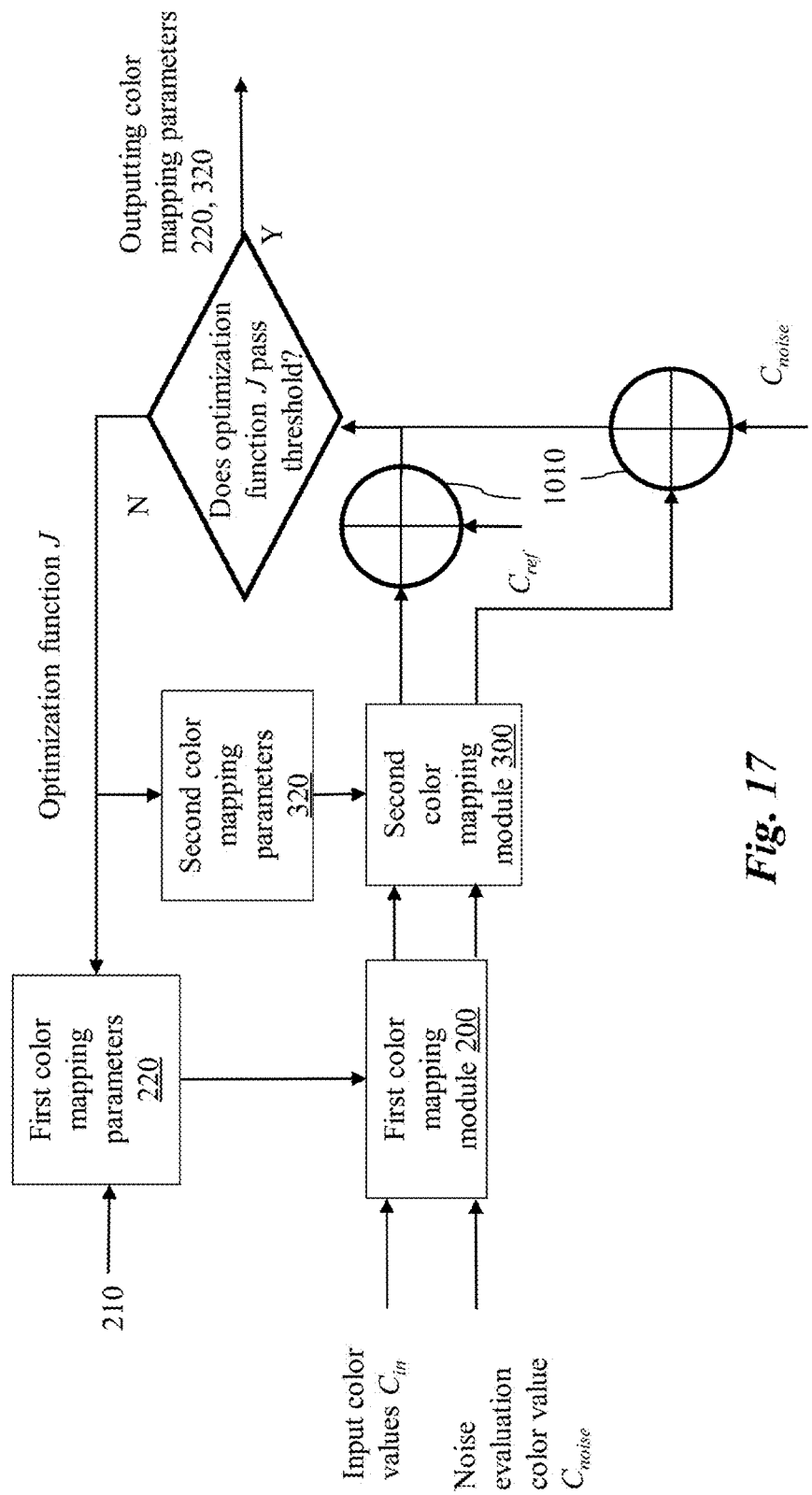
FIG. 17 is an exemplary block diagram illustrating an alternative embodiment of the calibration framework of FIG. 15, wherein noise evaluation color values can calibrate the first and second color mapping parameters.

Turning to FIG. 17, another exemplary calibration framework 1000 is shown. The noise evaluation color values Cnoise can be color mapped using the current values of the first color mapping parameters 220 and second color mapping parameters 320 to obtain post-mapping noise evaluation color values $\hat{C}_{noise}$. This operation can be represented as:

$$\hat{C}_{noise} = CC(C_{noise}) \qquad \text{Equation (10)}$$

The post-mapping noise evaluation color values $\hat{C}_{noise}$ (also referred to as color mapped noise evaluation color values $\hat{C}_{noise}$) can be compared to pre-mapping noise evaluation color values Cnoise, and the noise amplification metric Dnoise can be found based on the comparison. The noise amplification metric Dnoise can be any measure of the distance between post-mapping noise evaluation color values $\hat{C}_{noise}$ and the pre-mapping noise evaluation color values Cnoise. That is, the greater the value of the noise amplification metric Dnoise, the more noise is amplified after applying a color correction.

Where the noise amplification metric Dnoise is to be determined over multiple color references 150 (or, equivalently, over multiple color patches 151 of a given color reference 150), the noise amplification metric Dnoise can be taken as a weighted and/or unweighted average over the color patches 151. In one embodiment, the noise amplification metric Dnoise can be taken as a weighted average over the color patches 151.

$$D_{noise} = \frac{\sum_{i=1}^{N} \omega_i D_i}{\sum_{i=1}^{N} \omega_i} \qquad \text{Equation (11)}$$

where i is an index over the color patches 151, N is the total number of color patches 151, and $\omega_i$ is a non-negative weight for color patch i. The weights $\omega_i$ can be set according to the sensitivity of the average human perception to the color of each color patch 151. For example, colors having greater sensitivity of human perception can be given greater weights $\omega_i$.

The optimization function J can be computed as the weighted and/or unweighted sum of the color correction error ecolor and the noise amplification metric Dnoise. For example, an unweighted optimization function J can be represented as the following sum:

$$J = e_{color} + D_{noise} \qquad \text{Equation (12)}$$

In some embodiments, a weighted optimization function J can used to advantageously weight the color correction error ecolor more than the noise amplification metric Dnoise, or vice versa. The amount of weighting for the optimization function J can be determined, for example, by repeating color mapping parameter calibrations for different weights and selecting the weight that gives the best (for example, the lowest) value of the optimization function J. Alternatively and/or additionally, the amount of weighting for the optimization function J can be determined based on prior color mapping parameter calibrations (for example, using different digital imaging devices 800).

Whether the optimization function J passes a threshold can be determined. The threshold can be a pre-determined value that indicates that the color correction error ecolor and the noise amplification metric Dnoise reach an overall pre-determined amount. When the optimization function J passes the threshold, the color mapping parameters 220, 320 can thus be outputted from the calibration framework 1000 to be used by the image processing system 100 (shown in FIG. 12) for mapping subsequently-captured images.

When the optimization function J does not pass the threshold, the optimization function J can be fed back to be used for optimizing the color mapping parameters 220, 320 in a similar manner as described above with reference to FIG. 15.

In an illustrative and non-limiting example, the second color mapping parameters 320 outputted by the calibration framework 1000 can result in the color mapping curve 310 (shown in FIG. 2) in the following form:

$$f2(x) = 1.0 + 0.5799 * \log_{10}\left(\frac{255x + 2.52}{247.11}\right) \qquad \text{Equation (13)}$$

The calibration framework 1000 can thus provide further advantages. The calibration of color mapping parameters 220, 320 can help to minimize a difference between the post-mapping input color values $\hat{C}_{in}$ and the reference color values Cref. Accounting for color correction accuracy and image compression alone can result in parameters that excessively amplify noise. Image noise can include color and brightness variations in the image. These variations are not features of an original object imaged but, instead, are attributable to artifacts introduced by the acquisition and processing of the image. Sources of noise include, for example, quantum exposure noise, dark current noise, thermal noise, readout noise, and others. Since image noise can be inversely proportional to the size of the digital imaging device 800 (shown in FIG. 10), the problem of noise can be especially acute for smaller digital imaging devices 800. When image acquisition is performed aboard mobile platforms such as the UAVs 900 (shown in FIG. 11), the image noise problem is especially acute both because of the smaller cameras used on the mobile platforms and because of noise introduced by movement of the mobile platforms.

By adding the noise amplification metric Dnoise into the optimization function J, the calibration framework 1000 can increase color correction accuracy while limiting noise amplification.

Figure 18:
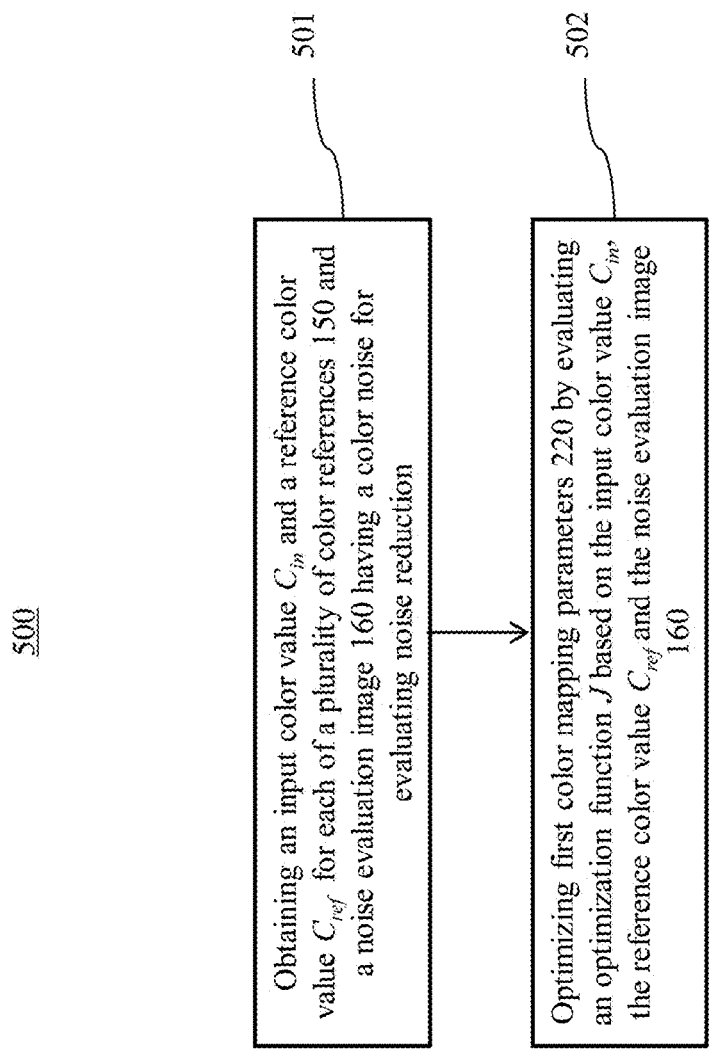
FIG. 18 is an exemplary flow chart illustrating another alternative embodiment of the method of FIG. 5, wherein the method includes optimizing first color mapping parameters.

Turning now to FIG. 18, another alternative embodiment of the method 500 is shown. The method 500 can be used for calibrating the first color mapping parameters 220 and/or second color mapping parameters 320. An input color value Cin and a reference color value Cref can be obtained, at 501, for each of a plurality of color references, and a noise evaluation image 160 having a color noise for evaluating noise reduction can be obtained, at 501. For example, the input color value Cin, the reference color value Cref, and the noise evaluation image 160 can be obtained in the manner shown in FIG. 16. The first color mapping parameters 220 can be optimized, at 502, by evaluating the optimization function J based on the input color value Cin, the reference color value Cref, and the noise evaluation image. The first color mapping parameters 220 can be adjusted so as to optimize the color correction error ecolor and the noise amplification metric Dnoise based on the input color values Cin, the reference color values Cref, and the noise evaluation image 160. An exemplary embodiment of the adjusting is described in more detail with respect to FIGS. 15 and 17. Optionally, the second color mapping parameters 320 can be adjusted in a similar manner as described above with reference to FIGS. 15 and 17.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for image processing, comprising:
    color correcting an image to obtain a color corrected image via performing a first color mapping process on the image based on a plurality of first color mapping parameters;
    compressing the color corrected image to obtain a compressed image via performing a second color mapping process on the color corrected image based on a plurality of second color mapping parameters; and
    performing a joint optimization process to optimize the first color mapping parameters and the second color mapping parameters.

2. The method of claim 1, wherein compressing the color corrected image comprises compressing the color corrected image via a grayscale mapping process.

3. The method of claim 2, wherein compressing the color corrected image comprises compressing a dynamic range of the color corrected image.

4. The method of claim 2, wherein compressing the color corrected image comprises:
    converting the color corrected image from a red-green-blue (RGB) color space to a luma-chroma color space; and
    performing the grayscale mapping process on a luma component of the color corrected image in the luma-chroma color space.

5. The method of claim 4, wherein performing the grayscale mapping process on the luma component comprises compressing a value range of the luma component of the color corrected image.

6. The method of claim 1, wherein compressing the color corrected image comprises reducing a bit width of the color corrected image.

7. The method of claim 1, wherein performing the joint optimization process comprises:
    obtaining an input color value and a reference color value for each of a plurality of color references; and
    determining the first color mapping parameters based on evaluating an optimization function.

8. The method of claim 7, wherein:
    the optimization function comprises a color correction error; and
    performing the joint optimization process comprises:
        color mapping the input color values via the first color mapping process and the second color mapping process to obtain color mapped input color values; and
        comparing the color mapped input color values with the reference color values to evaluate the color correction error.

9. The method of claim 7, wherein:
    the optimization function comprises a noise amplification metric; and
    performing the joint optimization process comprises:
        obtaining a noise evaluation image having a color noise for evaluating noise reduction;
        color mapping the noise evaluation image via the first color mapping process and the second color mapping process to generate a post-mapping noise evaluation image; and
        comparing the post-mapping noise evaluation image with the noise evaluation image to evaluate the noise amplification metric.

10. The method of claim 1, wherein performing the joint optimization process comprises adjusting the second color mapping parameters based on evaluating an optimization function.

11. The method of claim 1, further comprising reducing a bit width of the compressed image to a reduced bit width by truncating one or more least significant bits from the bit width of the compressed image.

12. The method of claim 11, further comprising encoding the compressed image at the reduced bit width.

13. The method of claim 12, further comprising decoding the compressed image.

14. The method of claim 11, further comprising:
    expanding the bit width of the compressed image via an inverse color mapping process to obtain an increased-bit-width image; and
    decompressing the increased-bit-width image during the inverse color mapping process to obtain a decompressed image.

15. The method of claim 14, wherein the inverse color mapping process is an inverse process of the second color mapping process.

16. The method of claim 14, further comprising performing a gamma correction process on the decompressed image to adapt the decompressed image for presentation.

17. A system for image processing, comprising:
    one or more processors; and
    a memory storing instructions that, when executed by the one or more processors, cause the one or more processors to:
        color correct an image to obtain a color corrected image via performing a first color mapping process on the image based on a plurality of first color mapping parameters;

compress the color corrected image to obtain a compressed image via performing a second color mapping process on the color corrected image based on a plurality of second color mapping parameters; and perform a joint optimization process to optimize the first color mapping parameters and the second color mapping parameters.

18. A digital imaging device, comprising:

an image sensor; and one or more processors that operate to:

obtain an image via the image sensor;

color correct the image to obtain a color corrected image via performing a first color mapping process on the image based on a plurality of first color mapping parameters;

compress the color corrected image to obtain a compressed image via performing a second color mapping process on the color corrected image based on a plurality of second color mapping parameters; and perform a joint optimization process to optimize the first color mapping parameters and the second color mapping parameters.

\* \* \* \* \*